(12) United States Patent
Squires et al.

(10) Patent No.: US 7,065,567 B1
(45) Date of Patent: Jun. 20, 2006

(54) PRODUCTION SERVER FOR AUTOMATED CONTROL OF PRODUCTION DOCUMENT MANAGEMENT

(75) Inventors: David Forrest Squires, Glendale, CA (US); Sudhendu Rai, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 667 days.

(21) Appl. No.: 09/706,078

(22) Filed: Nov. 3, 2000

(51) Int. Cl.
*G06F 15/173* (2006.01)

(52) U.S. Cl. ............... 709/223; 709/203; 358/1.12; 358/1.14; 358/1.15; 707/2; 707/10; 718/101

(58) Field of Classification Search ............ 709/223, 709/226, 203; 358/1.15, 115; 717/103; 707/2, 10; 718/101
See application file for complete search history.

(56) References Cited

U.S. PATENT DOCUMENTS

| | | | |
|---|---|---|---|
| 4,887,218 A | | 12/1989 | Natarajan |
| 4,896,269 A | | 1/1990 | Tong |
| 4,956,784 A | | 9/1990 | Hadavi et al. |
| 4,974,166 A | | 11/1990 | Maney et al. |
| 5,093,794 A | | 3/1992 | Howie et al. |
| 5,229,948 A | | 7/1993 | Wei et al. |
| 5,751,580 A | * | 5/1998 | Chi ........................... 700/101 |
| 5,815,764 A | * | 9/1998 | Tomory ......................... 399/1 |
| 5,918,226 A | | 6/1999 | Tarumi et al. |
| 5,946,661 A | | 8/1999 | Rothschild et al. |
| 5,978,560 A | * | 11/1999 | Tan et al. .................. 358/1.15 |
| 6,263,253 B1 | | 7/2001 | Yang et al. |
| 6,278,901 B1 | | 8/2001 | Winner et al. |
| 6,348,971 B1 | * | 2/2002 | Owa et al. ................. 358/1.15 |
| 6,509,974 B1 | * | 1/2003 | Hansen ....................... 358/1.12 |
| 6,546,364 B1 | * | 4/2003 | Smirnov et al. .............. 703/22 |
| 6,650,431 B1 | * | 11/2003 | Roberts et al. ............. 358/1.15 |
| 6,728,947 B1 | * | 4/2004 | Bengston .................... 717/103 |
| 2002/0101604 A1 | | 8/2002 | Mima et al. |

OTHER PUBLICATIONS

U.S. Appl. No. 09/706,430, filed Nov. 3, 2000, Rai et al.
U.S. Appl. No. 09/767,976, filed Jan. 23, 2001, Rai, et al.

(Continued)

*Primary Examiner*—Jeffrey Pwu
(74) *Attorney, Agent, or Firm*—Fay, Sharpe, Fagan, Minnich & McKee, LLP (57) ABSTRACT

A printing workflow system for coordinating production of document processing jobs among a plurality of cells, where a cell is comprised of at least one device for completing the document processing jobs. The present invention is directed toward further substances in the art as they relate to a print shop comprised of a network of cells to accomplish printing a document processing job. Each cell is comprised of at least one printing device for completing the document processing jobs. The print workflow is further comprised of a workflow mapping module that determines a workflow of one of the many document processing jobs for processing. A job description module for splitting the various document processing jobs into sub-jobs for processing by the printing devices in the cells. A print cell controller at any one of the cells for receiving at least one sub-job and for further split the sub-job into lots for processing among devices in the selected cell. The printing workflow system of the present inventions allows for the distribution of document processing jobs throughout a network environment.

11 Claims, 11 Drawing Sheets

OTHER PUBLICATIONS

U.S. Appl. No. 09/735,167, filed Dec. 12, 2000, Jackson et al.

U.S. Appl. No. 09/771,740, filed Jan. 29, 2001, Garstein.

Hopp, Wallace J. and Spearman, Mark L., *Factory Physics: Foundations of Manufacturing Management*. McGraw-Hill Professional Book Group, Boston, Massachusetts. ISBN: 0-256-15464-3; pp. 153-156; 323-325; 462-485 (Sep. 1995).

Luqi, et al., *a Prototyping Language for Real-Time Software*. IEEE Transactions on Software Engineering, vol. 14, No. 10, Oct. 1988, pp. 1409-1423.

*ADF or LDF? Introducing the Lean Document Factory I*, Xerox Corporation, Power Point Presentation, Nov. 4, 1999.

*ADF or LDF? Introducing the Lean Document Factory II*, Xerox Corporation, Power Point Presentation, Nov. 4, 1999.

Rai, Sudhendu, Xerox Corporation, *Print Shops as Document Factories, The Future of Manufacturing: New Developments in Technology and System Design*; Massachusetts Institute of Technology; Power Point Presentation, Apr. 19, 2000, pp. 1-18.

Gershwin, Stanley and Rai, Sudhendu, *Applicaiton and Extension of Manfacturing Systems Engineering Techniques to Print Shops*; Dept. of Mechanical Engineering, Massachusetts Institute of Technology, and Wilson Center for Research Technology, Xerox Corporation; Power Point Presentation; Sep. 29, 1999, pp. 1-15.

Gershwin, Stanley B., *Manufacturing Systems Engineering*, Prentice-Hall, 1994.

*Cellular Manufacturing: One-Piece Flow for Workteams*, ISBN: 156327213X, Productivity Press Inc.; Apr. 1999.

Wu, N., *A Concurrent Approach to Cell Formation and Assignment of Identical Machines in Group Technology*, Int. J. Prod.. Res., 1998, vol. 36, No. 8, 2099-2114; Science Center, Shantou University, Shantou 515063, China.

\* cited by examiner

PRODUCTION SERVER FOR AUTOMATED CONTROL OF PRODUCTION DOCUMENT MANAGEMENT

FIELD OF THE INVENTION

The present invention relates generally to a document production server and more particularly to coordinating production of document processing jobs in a print shop.

BACKGROUND OF THE INVENTION

Conventional print shops are organized in a manner that is functionally independent of the print jobs, the print job mix, and the total volume of print jobs passing through the system. Most commonly, equipment that is somewhat related is grouped together on a factory floor. This causes all printing equipment to be grouped in a single locale and for example, all finishing equipment to be grouped in a separate locale. In other words, conventional print shops typically organize resources into separate departments, each department corresponding to a particular process that is performed in completing a print job.

When a print job arrives, the print job sequentially passes though each department. Once the print job is completely processed by a first department, the print job is placed in queue for the next department. The queue is sometimes in the form of a temporary storage facility. This process continues until the print shop makes its way through each department and is completed.

There are a number of limitations with conventional print shops. For example, the equipment employed in conventional print shops is not well interfaced with internal computer systems. In addition, the equipment is often physically organized in an inefficient arrangement. Typical arrangements employ machines that require operators to load/unload jobs, monitor job progress, pass jobs on to a next station, and commence a next job. In between each of the steps, each job is commonly stored in a storage area awaiting the next step of the job. As a result, excess inventories may buildup and add to the costs of the job. A physical job card is used to track progress of a job. The job card specifies the steps needed to be completed to finish the job. The job card also specifies the steps already completed, and the order in which steps are to be performed. The data regarding job completion is manually added to the job card, or sometimes is only remembered by the operators working on the job. The lack of real time information concerning the contemporaneous state of the machines and the jobs leads to less efficient plant utilization, and lower productivity. Further, large jobs cannot easily be split into more efficient smaller job lots due to the difficulty in tracking the smaller job lots.

SUMMARY OF THE INVENTION

For the foregoing reasons, there exists in the art a need for a more efficient strategy to producing print jobs. The present invention provides a solution to the above-described problems by providing a system and method for coordinating production of document processing jobs among a plurality of autonomous cells. A "cell" comprises at least one device for completing the document processing jobs.

In accordance with one example embodiment of the present invention, a printing workflow system is disposed in a network for coordinating production of document processing jobs. The printing workflow system is comprised of a plurality of cells, where each cell is comprised of at least one device for completing the document processing jobs.

The printing workflow system may include a workflow mapping module that determines a workflow of the document processing jobs. The printing workflow system additionally includes a job description module for splitting the various document processing jobs into sub-jobs. A print cell controller is provided at selected one of the cells for receiving at least one sub-job and for further splitting the sub-job into lots for processing among devices in the selected cell.

In accordance with an additional aspect of the present invention, a method is provided for assigning sub-jobs to available cells in a priority workflow system for printing a product-type. The method entails identifying the maximum capacity of the available cells to print the product type. The current capacity of each of the available cells to print product type is also identified. Based on the maximum capacity and current loading of each of the available cells, a current capacity of each of the available cells for printing the product-type is determined. At least one of the available cells is assigned for printing.

BRIEF DESCRIPTION OF THE DRAWINGS

The aforementioned features and advantages, and other features and aspects of the present invention, will become understood with regard to the following description and accompanying drawings; wherein.

DETAILED DESCRIPTION OF THE INVENTION

The illustrative embodiment of the present invention provides a lean production process server (LPPS) for coordinating production of document processing jobs in a document factory (such as a print shop). The server exploits lean production techniques to control document processing jobs. The server can be run on a UNIX, Windows or Window NT based-platform, such as a server computer system. The server determines workflow priorities and manages workflow accordingly. Those skilled in the art will appreciate that the present invention may also be practiced with platforms that run other varieties of operating systems. Moreover, the server need not run on a dedicated computer system but rather may run on another variety of electronic device, such as a printer, copier, etc. Workflow priorities for document processing jobs can be determined by observing the various jobs processing units.

The illustrative embodiment presumes that the document factory has been partitioned into autonomous cells. Each cell is a logical grouping of resources (including both equipment and manpower) in the document factory that is sufficient for completing at least one type of document processing job. Thus, a first cell may include a printer and binder whereas a second cell may include a copier and a collator. The LPPS is responsible for distributing document processing jobs in such cells in an efficient manner (as will be described in more detail below).

Referring now in detail the drawings, wherein the parts are designated by the reference numerals throughout, FIGS. 1 through 14 illustrate example embodiments of a printing workflow system and a method for assigning sub-jobs to various cells in the printing workflow system or according to the present invention. Although the present invention will be described with reference to the example embodiments illustrated in the figures, it should be understood that the present invention could be embodied in many alternative forms.

Figure 1:
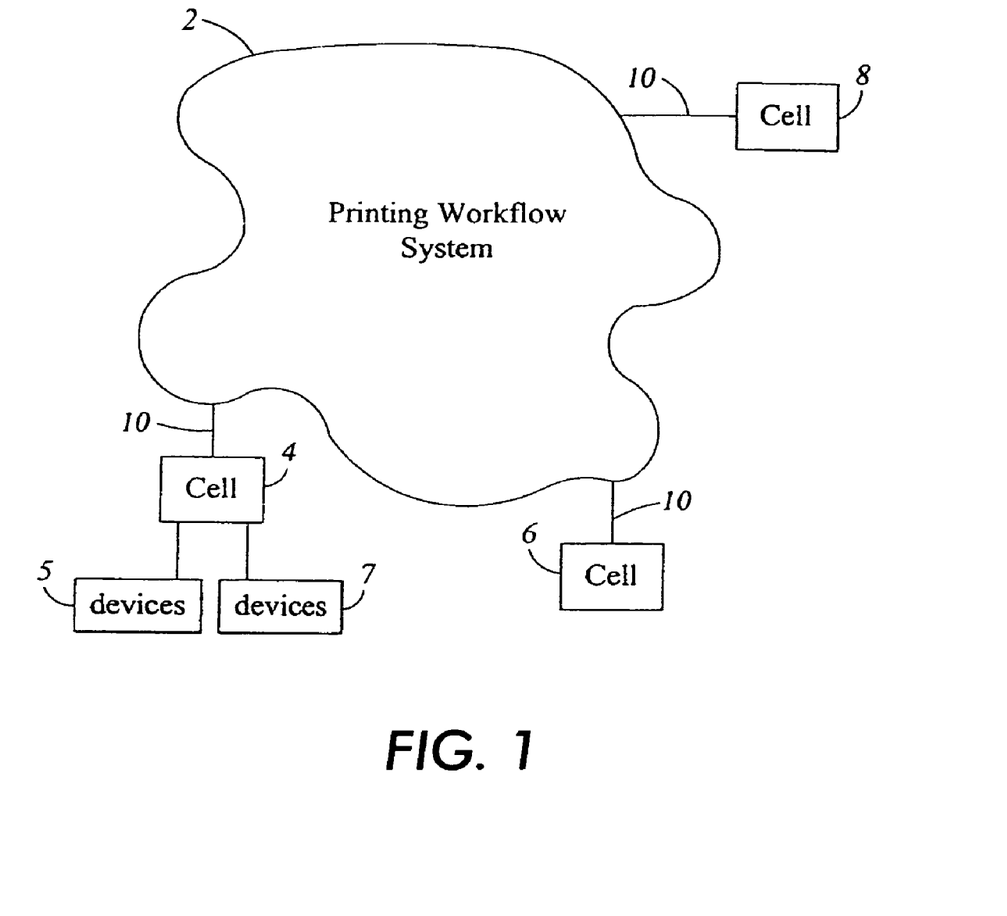
FIG. 1 is a diagrammatic illustration of a printing workflow system in combination with cells and their corresponding devices according to one aspect of the present invention.

FIG. 1 illustrates a printing workflow system 2 in a print shop (i.e., a document factory). The printing workflow system 2 controls a multitude of cells 4, 6, 8 connected by communication links 10 to the printing workflow system 2. The printing workflow system 2 sends information to and receives information from the cells 4, 6, 8 via the communication links 10. The cells 4, 6, 8 are comprised of at least one device 5 for assisting in completing a document processing job of a given product-type. For example, printing device 5 can be a laser printer 600 dpi and printing device 7 can be a color printer 1200 dpi. There is no dependence among cells 4, 6, 8 and their corresponding printing devices in that each operates autonomously relative to the other cells.

Figure 2:
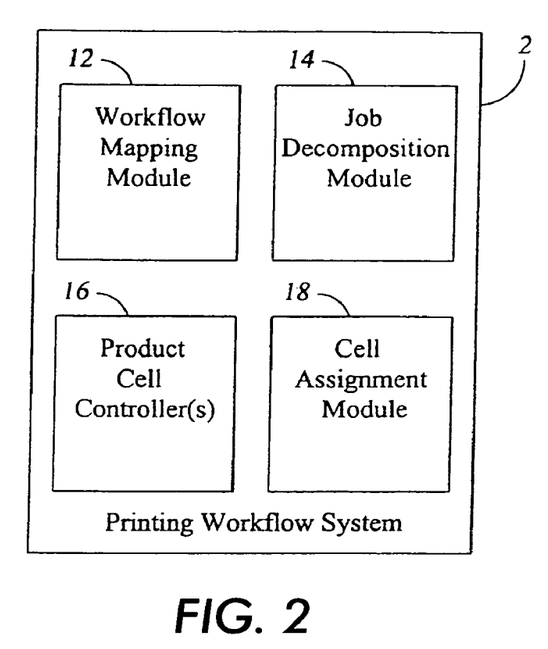
FIG. 2 is a diagrammatic illustration of software components employed in the printing workflow system of FIG. 1.

FIG. 2 illustrates several of the software modules employed in the printing workflow systems 2. The printing workflow system 2, includes a workflow mapping module 12 that determines the workflow for selected document processing jobs. As will be described in more detail below, the workflow identifies the operational steps reserved to complete a document processing job. The workflow also identifies the sequence of these operational steps. A job decomposition module 14 is included for splitting the document processing jobs into sub-jobs and for sending the sub-jobs to cells for completion. A product cell controller (PCC) 16 may be provided at given cells for receiving at least one sub-job to further split the sub-job to be processed by a printing device in the cell. Lastly, a cell assignment module 18 is provided for assigning sub-jobs to be processed by a cell.

Figure 3:
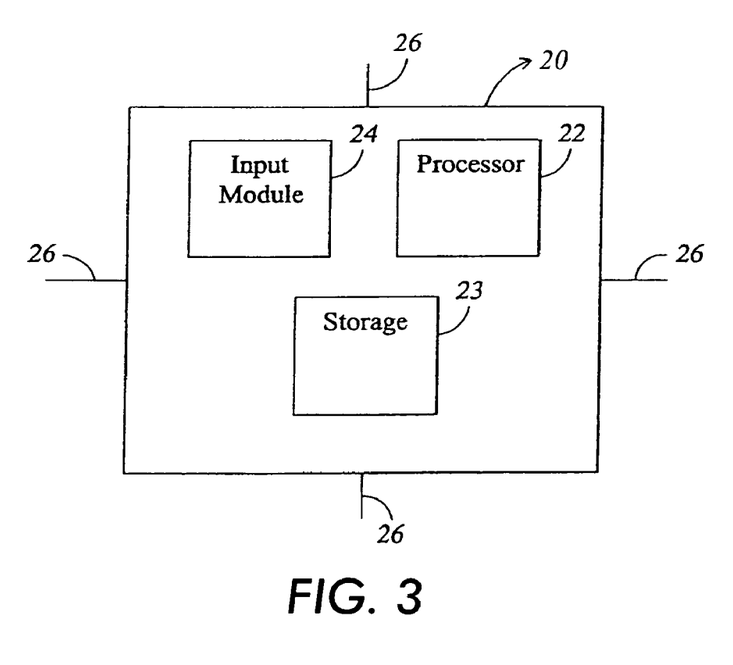
FIG. 3 is an illustration of a server 20 employed in the printing workflow system.

FIG. 3 illustrates a server computer system 20, (i.e., LPSS) that is suitable for use in the printing workflow system 2. The server 20 includes processor 22, a storage 23, communication links 26, and an input module 24. The input module 24 is used to receive input from various devices via the communications links 26. The input module 24 receives the document processing jobs on behalf of the server 20. The processor 22 executes the programming instructions on the server 20 to manage document processing jobs. The server 20 stores the instructions in the storage 23. For example, modules 12, 14, and 18 and other data are stored in storage 23. Module 16 may be executed on a separate server that is particular to a cell.

In general, a print job is received and a workflow for the print job is developed by the workflow mapping module 12. The job decomposition module may split the job into sub-jobs. The sub-jobs or job are then assigned to cells for completion by the cell assignment module 18. The sub-jobs may be sent to product cell controller 16 of the assigned cells, where each sub-job may be further sub divided.

Figure 4:
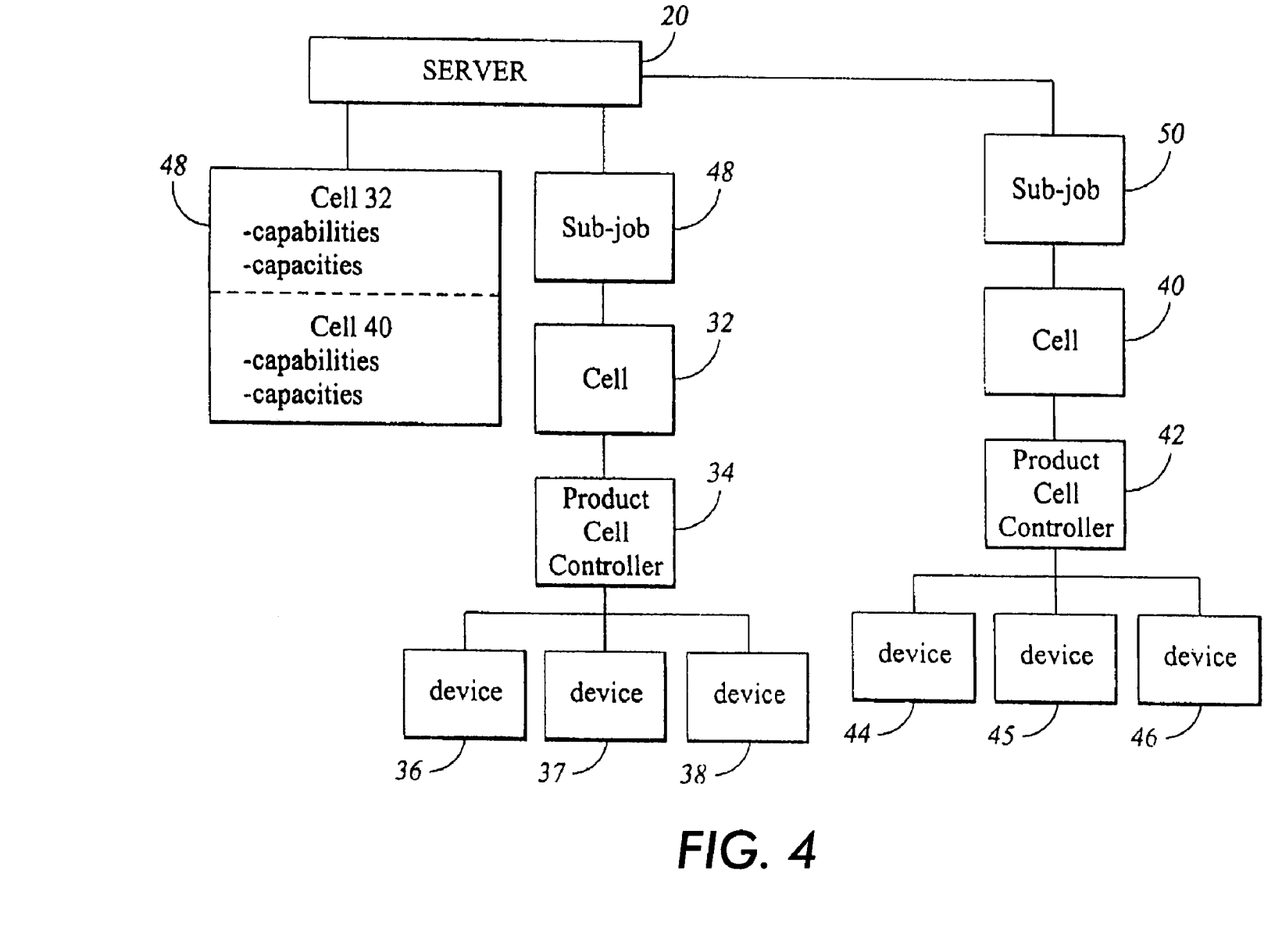
FIG. 4 illustrates the splitting of a document processing job into sub-jobs in the illustrative embodiment.

FIG. 4 illustrates the printing workflow system 2 interacting with a cell in a network provided in a print server. The product cell controller 16 for the cell receives a sub-job 48 from the server 20 to be further processed by the cell. The server 20 stores in its storage 23 the capacities and capabilities of each cell in the print shop to produce different product-types. For example, cell 32 in the network produces three different types of documents and cell 40 produces two types of documents. (It is quite possible that two different cells can produce similar document types. A document type is uniquely characterized by the sequence of processing steps to completely finish the document) The server 20 stores this information to determine which cell has the capabilities to process a document job. The printing workflow system 2 also stores the capacity of each cell to determine the volume of a particular product-type that a cell can produce. As stated above, the job decomposition module 14 splits a document processing job into sub-jobs to be sent to various autonomous cells for processing. The cells in the network are autonomous and can produce their respective product entirely by themselves. Thus, in the example shown in FIG. 4, a document processing job is split into sub-jobs 48 and 50 that are sent to cells 32 and 40, respectively. The product cell controllers 34 and 42 send the sub-jobs 48 and 50 to devices 36, 37, 38 and 44, 45, 46 in the respective cells 32 and 40 for processing.

Figure 5:
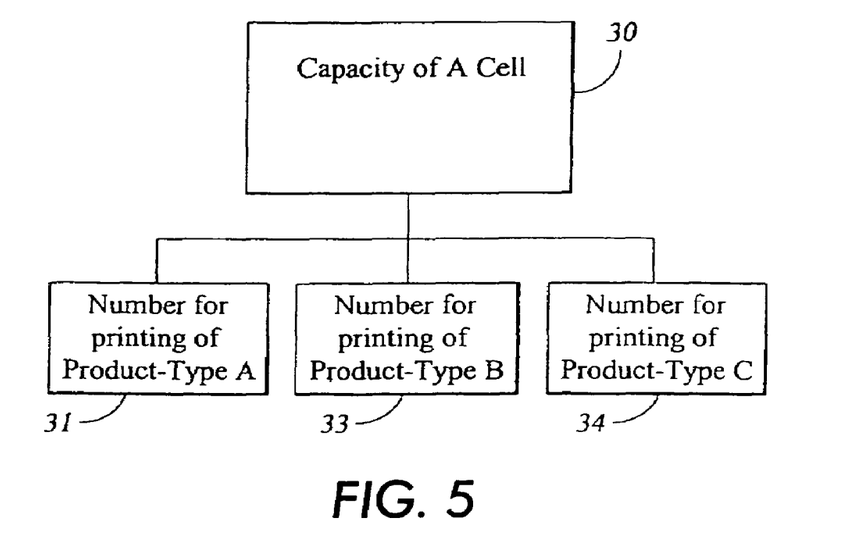
FIG. 5 is an illustration of a capacity of a cell.

FIG. 5 illustrates an example of how capacity is defined for a cell in the illustrative embodiment. As stated above, the printing workflow system 2 stores the capacity of each cell. "Capacity" is the maximum volume of a particular product type that the cell can produce for a time period. For example, FIG. 5 shows capacities for 31, 33, and 34 three different product types (Product A, Product B, and Product C) The printing workflow system 2 updates the capacities and makes it easier to determine which cells should be assigned a sub-job.

Figure 6:
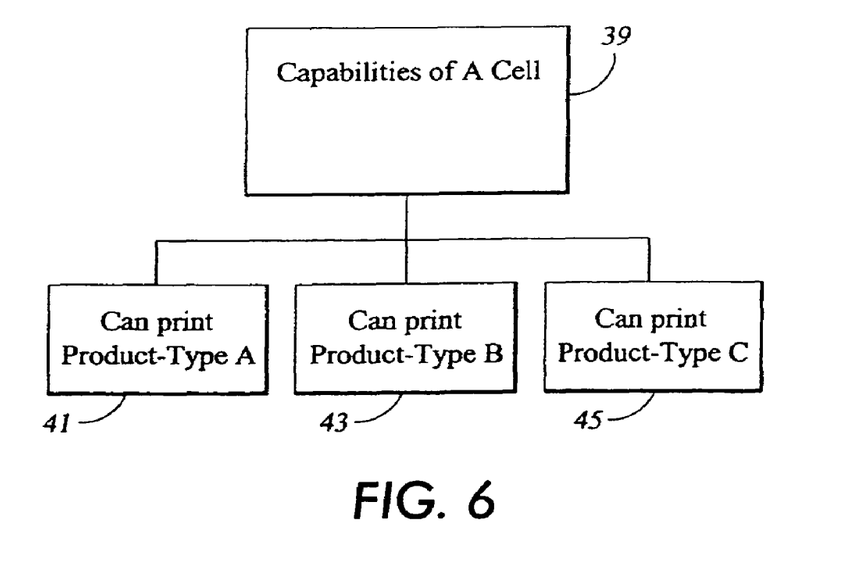
FIG. 6 is an illustration of capabilities of a cell.

Capabilities are used to determine the assignment for a cell to process a sub-job. FIG. 6 shows an example of the capabilities 39 stored for a cell 32. Cell 32 is capable of processing various document product-types A, B, C. Hence, capabilities 41, 43, and 45 are stored for cell 32. For example, if a user has a document of product-type D, then cell 32 would not be the choice to accomplish the processing of the document because the cell 32 does not support such a capability. The print workflow system 2, stores the capabilities for each cell in the print shop. This allows the cell assignment module 18 to examine the capacities and capabilities of the cells to determine which cell to assign a particular sub-job.

Figure 7:
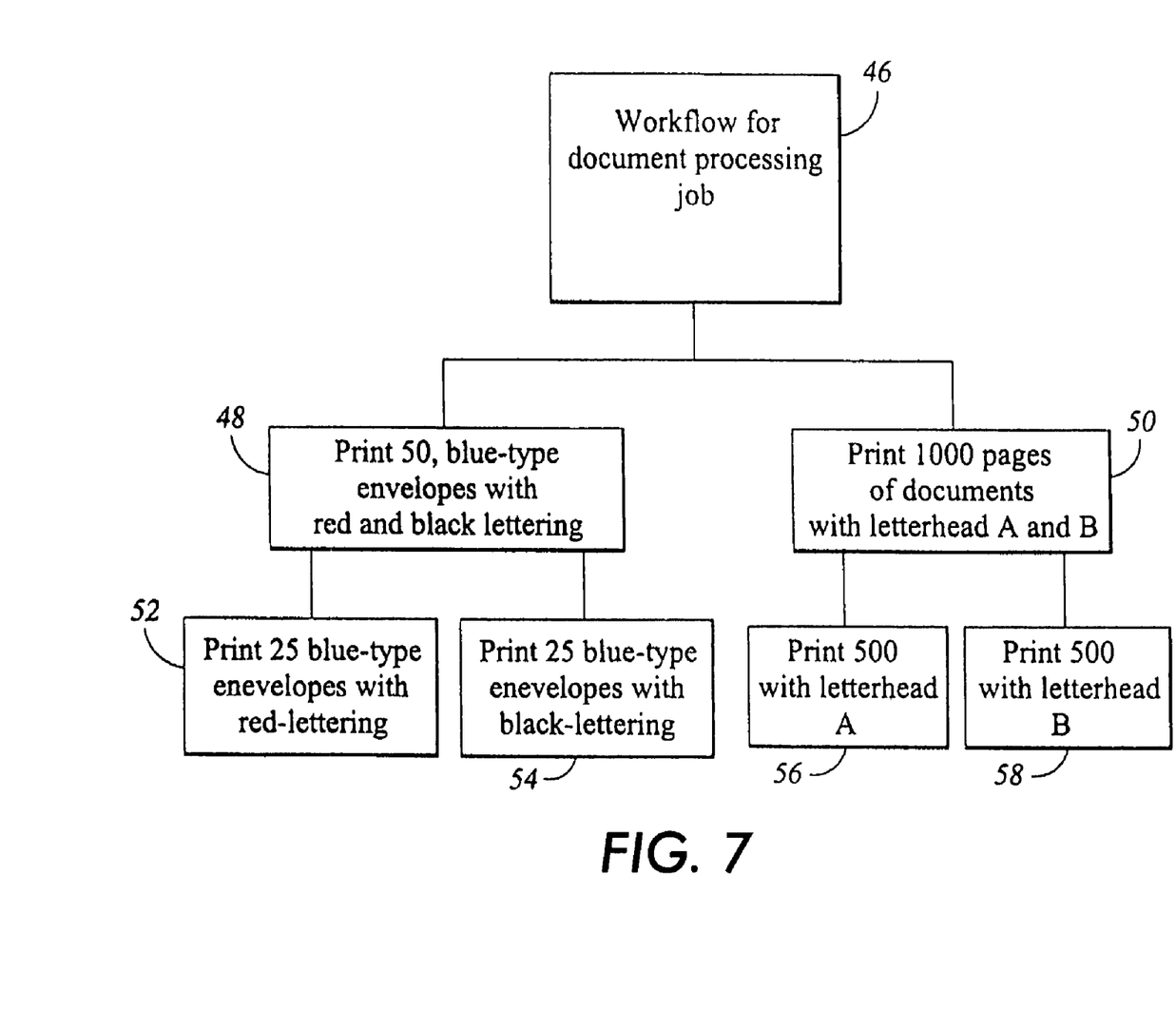
FIG. 7 is an illustration of splitting of a sub-job.

The workflow mapping module 12 of the printing workflow system 2 determines the workflow for document processing jobs. Workflow is represented strategically as a tree diagram. FIG. 7 illustrates as example embodiment of a workflow tree diagram. Once the printing workflow system 2 reviews an input document processing job, the workflow mapping module 12 generates a tree diagram representation of the document processing job and the input that outlines the sequence of operations that need to be performed to complete and deliver the document processing job. For example, the workflow 46 demonstrates a document processing job to print fifty blue envelopes with red and black lettering and to print 1000 pages of a certain document with black lettering of two kinds of letterhead A & B. The workflow mapping module splits the fifty blue-type envelopes with red and black lettering and the 1000-page document with black lettering of two kinds of letterhead A & B into sub-jobs 48, 50. Thus, creating two sub-jobs 48, 50 that are mutually independent from each other. Given that sub-job 48 requires fifty blue envelopes, 25 blue envelopes having red lettering and 25 blue envelopes having black lettering. The product cell controller 16 further splits sub-job 48 into two lots 52, 54.

The workflow mapping module 12 determines workflow so that the workflow is reasonable for the cell and device arrangements. For example, if the print shop only has one printer to print blue-type envelops with red and black lettering, then the workflow mapping would not split sub-job 50 into two lots for two print devices. The workflow mapping module 12 splits sub-job 50, which requires 1000 pages with letterhead A and B into lots 56 and 58, where 500 pages with letterhead A and 500 pages with letterhead B are printed. The other modules 14, 16, 18 of the printing workflow system 2 use the workflow mapping module 12 to aid in distributing sub-jobs among the various cells in the network.

Figure 8:
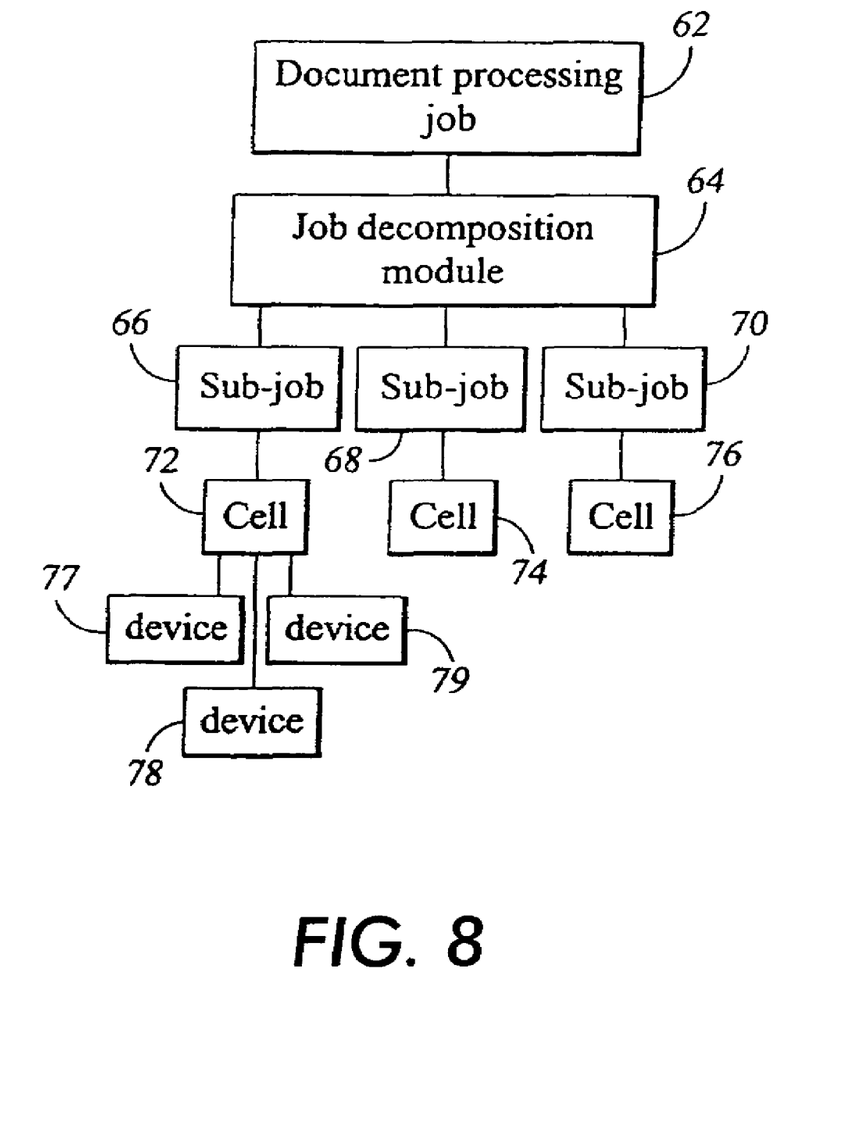
FIG. 8 is an illustration of a job decomposition module.

The job decomposition module 14 of the printing workflow system 2 receives a document processing job and splits the document processing job into sub-jobs. As shown in FIG. 8, document processing job 62 is processed by the job decomposition module 64 to determine whether decomposition is appropriate. The document processing job 62 is composed of a multitude of printing requests. Dependent on the size of the document processing job 62 and the overall capacity of the cell arrangements in the network, the job decomposition module 64 determines how to process the document processing job 62. In the case shown in FIG. 8, the job decomposition module 64 splits the document processing job 62 into autonomous sub-jobs 66, 68, 70.

The job decomposition module 64 uses workflow information created by the workflow mapping module 46 to decide how to split the document processing job 62. Once the document processing job 62 has been split, the sub-jobs 66, 68, 70 are sent to a number of cells 72, 74, 76 for further processing. The job decomposition module 64 provides a flexible way to distribute sub-jobs 66, 68, 70 to cells 72, 74, 76 in the network. For example, when cell 72 receives sub-job 66, the cell 72 determines how to process sub-job 72 among the printing and/or finishing devices 77, 78, 79. The job decomposition module 64 decides which of the cells 72, 74, 76 will receive the sub-jobs 66, 68, 70 to efficiently process document processing job 62.

Figure 9:
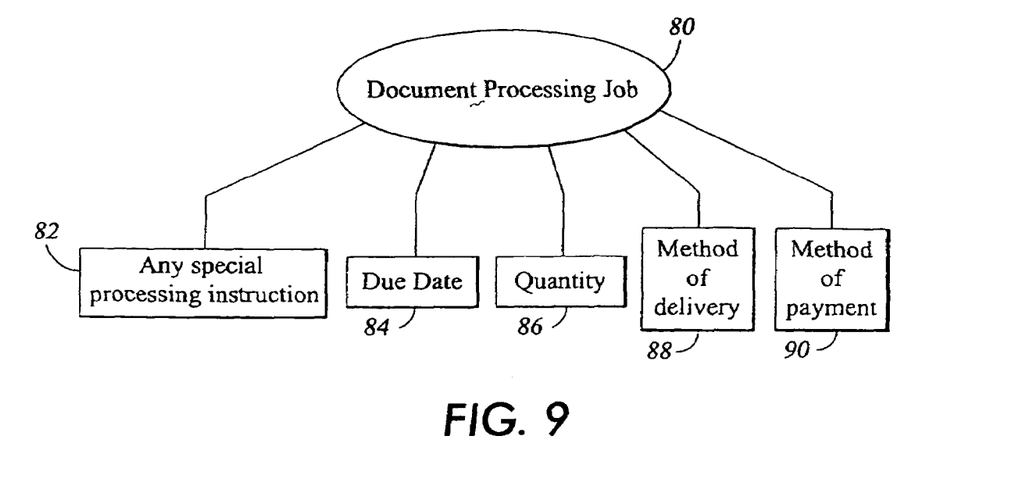
FIG. 9 is an illustration of data structures of a document processing job.

Each document processing job 62 is composed of a set of parameters that define its structure. FIG. 9 shows an example of some parameters for a document processing job. The document processing job 80 is comprised of a set of defined parameters 84, 86, 88, 90, 82. These parameters 84, 86, 88, 90, 82 are provided by a customer and inputted into the network with or without human intervention. The printing workflow system 2 validates the document processing job 80 to ensure that the job 80 is valid and contains all relevant parameters 84, 86, 88, 90, 82 to process it. The printing workflow system 2 parses the document processing job 80 to guarantee validity of the job. The data parameter 84 defines the due date that a particular document processing job needs to be completed. Also, data parameters 86 and 88 defines the quantity of a product-type to be processed in the document processing job 80 and the method of delivery (UPS or FedEx) being used to deliver the completed document processing job 80. The data parameter 90 defines the method of payment (credit card, debit, check) for the completed document processing job 80. The data parameter 82 defines any special processing instructions that are not stipulated in data parameters 84, 86, 88, 90 that are additionally necessary to completely process the job. For example, sending a portion of document processing job 80 to one location using one method of delivery while sending the other portion to another location using a different method of delivery.

Figure 10:
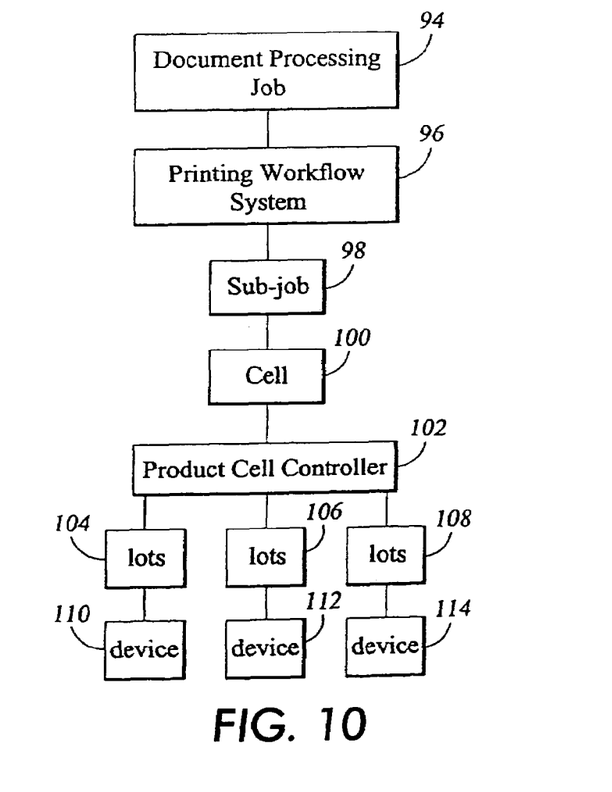
FIG. 10 illustrates step performed by a product cell controller.

FIG. 10 illustrates a product cell controller (PCC). Once the cells 72, 74, 76 receive their respective sub-jobs 66, 68, 70 each cell 72, 74, 76 employs its product cell controller (PCC) 116 for managing further processing of the sub-jobs. As shown in FIG. 8, the job decomposition module 64 performs the splitting of the job into sub-jobs and sends the sub-job information 66, 68, 70 to the respective cells. At this point, a cell 100 receives information to process one of these sub-jobs 98. The PCC 102 for the cell 100 receives the sub-job 98 for further processing. The PCC 102 further splits the sub-job 98 into lots 104, 106, 108 for processing. PCC 102 uses the workflow system 96 of document processing job 94 to assign which devices 110, 112, 114 to use to accomplish processing the sub-job 98. The optimal lot size is determined by analyzing the workflow of the document processing job 94 and characteristics of its various elements. The PCC 102 has the ability to adjust the lot-size. For example, cell 100 may take the document processing job 94 size of 300,000 and split them into lot sizes of 150,000 to be distributed among the devices 110, 112, 114.

Figure 11:
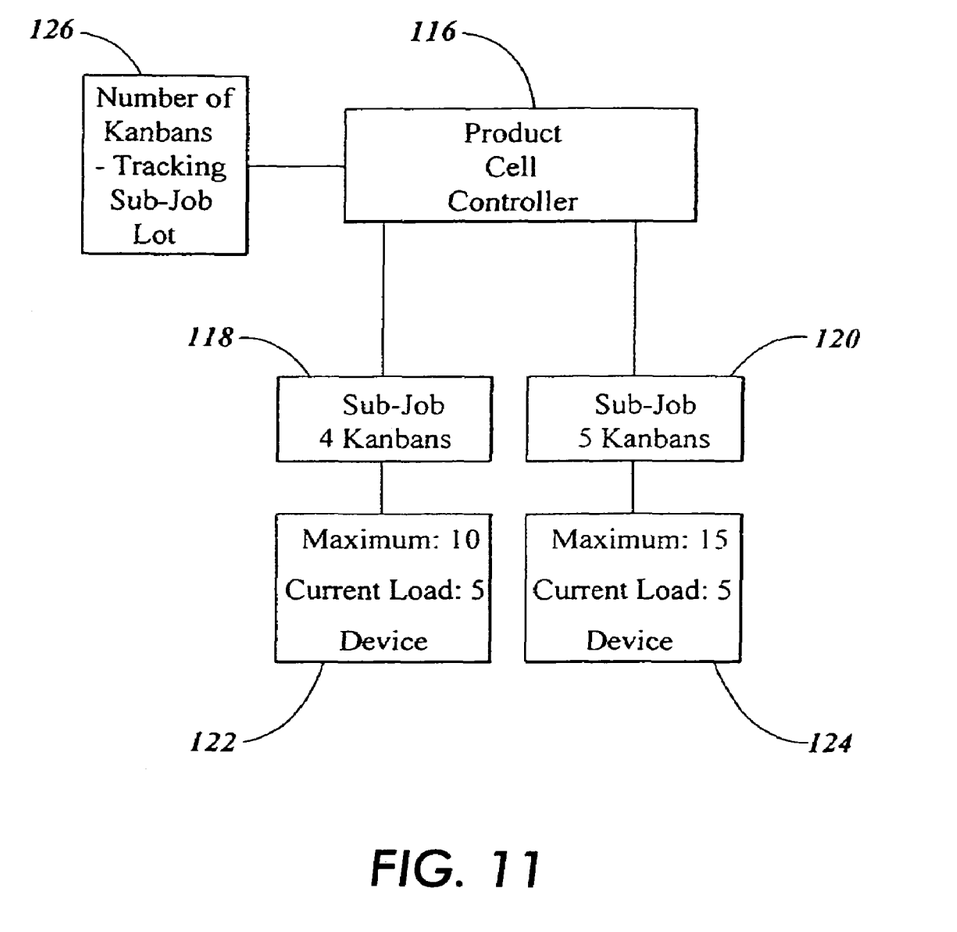
FIG. 11 is an illustration of assigning "kanbans" to a document processing job

FIG. 11 illustrates using a "kanban" (i.e., an electronic job card) assigned to a specific sub-job according to one output of the present invention. The PCC 116 uses a pull control policy where the last device in the workflow sends authorization to upstream process to supply it with the necessary input. This information is cascaded via the use of pre-specified number of kanbans per operation of a lot. For example, a device 122 may send an authorization to upstream printer to supply it with job lot 118 of 300 pages to begin printing. It could be assigned 3 "kanbans" by PCC 116, while device 124 may send another authorization to upstream to supply it with job 120 or 500 pages to begin printing. Also, it would be assigned 5 "kanbans". PCC 116 keeps track of the number of kanbans that devices 122, 124 use. Also, PCC 116 manages the maximum number of "kanbans" to use in each of the devices 122, 124. As these kanbans are freed up when lots have been processed, they become available for future authorization. The PCC 116 adjusts the lot sizes 118, 120 for better utilization by the devices 122, 124. This arrangement allows PCC more control of the utilization of devices to accomplish processing lots 118, 120.

Figure 12:
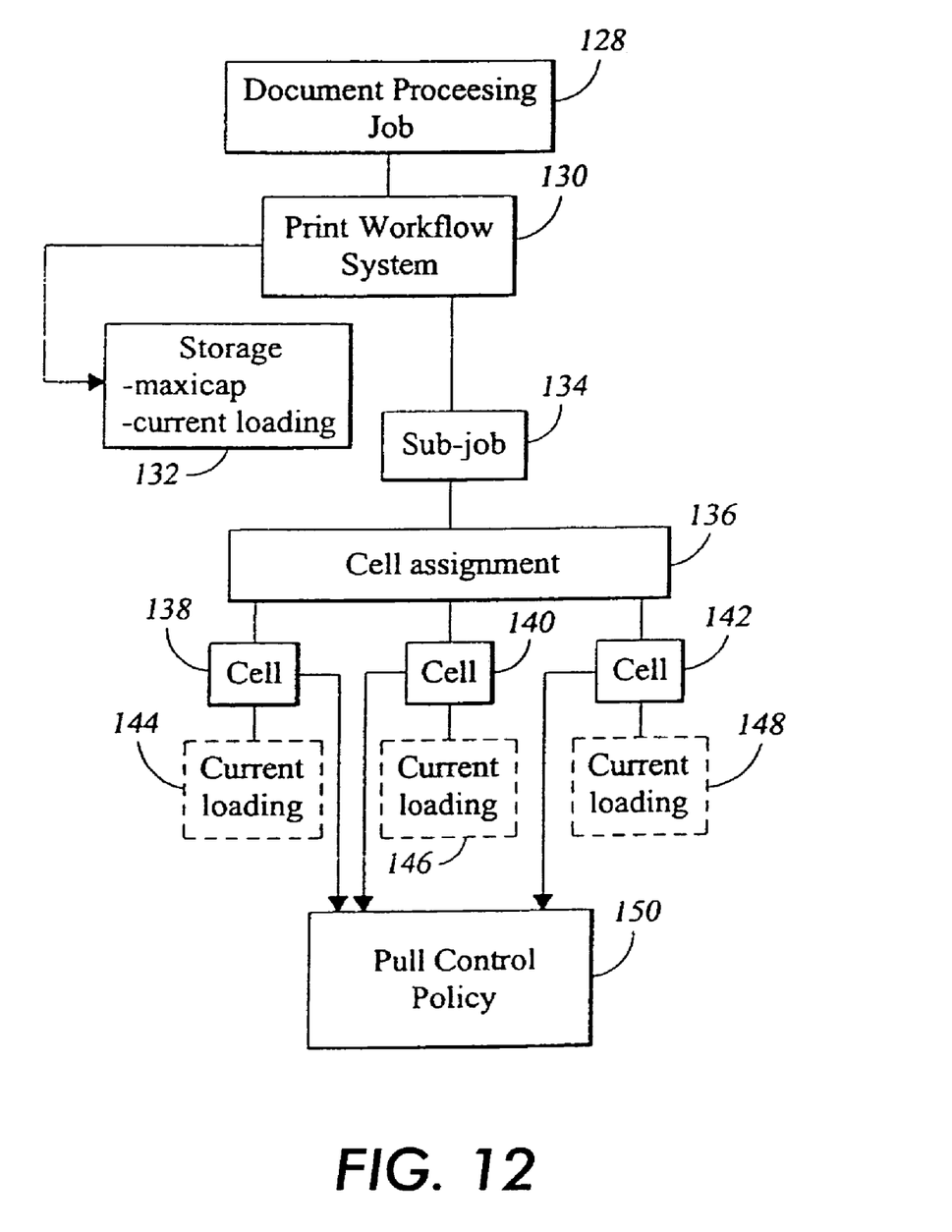
FIG. 12 is an illustration of assigning sub-jobs to cells.

FIG. 12 illustrates using a cell assignment module to assign sub-jobs to cells. The printing workflow system 130 stores all the necessary information 132 used by the cell assignment module, such as maximum capacity, current capacity and current loading of a cell. Essentially, the print workflow system 130 updates all the necessary information 132 of cells 138, 140, 142 if there is adding or removal of devices in a particular cell. Having the printing workflow system 130 update all of the necessary information 132, allows cell assignment module access to updated information without retrieving such information from the cells 138, 140, and 142. The cell assignment module 136 follows various steps before the determination of which cells 138, 140, and 142 will handle sub-job 134.

Figure 13:
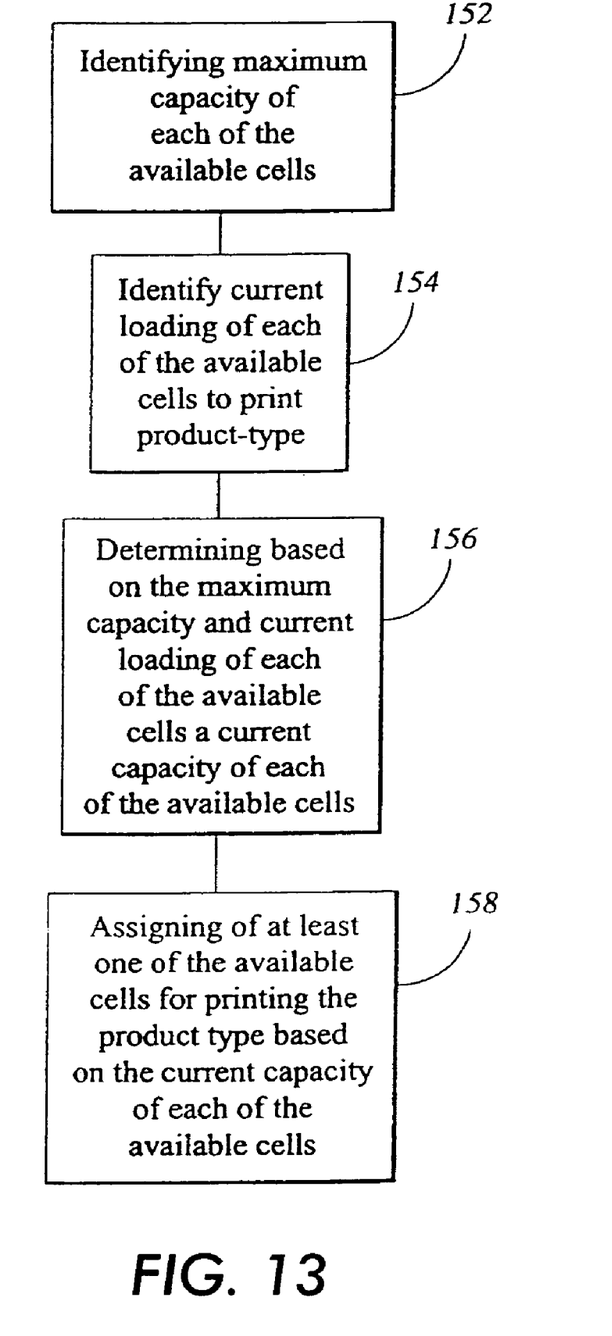
FIG. 13 is an illustration of assigning sub-jobs to determining the capabilities, capacities, and current loading determining the current capacity of each of the available cells.

FIG. 13 illustrates the steps used by the cell assignment module 136 to assign a sub-job 134 to one of the cells 138, 140, and 142. As shown in step 152 the cell module needs to identify the maximum capacity of each cell to handle any sub-job. The various cells 138, 140, and 142 each have their own maximum capacity to process a sub-job 134. In step 154, the cell assignment module 136 identifies the current loading of each respective cell. Current loading signifies the amount of work being processed by the cell at a given time. As shown in FIG. 12, cells 138, 140, and 142 have their respective current loading 144, 146, 148. In step 156, demonstrates based on the maximum capacity and current loading of each respective cell 138, 140, and 142 current capacities 144, 146 148 to process a sub-job.

Based on the maximum capacity and current loading of each respective cell 138, 140, 142, the current capacity of each cell at that instant moment to process a sub-job is determined. For example, cell 138 has a current loading of 1000 pages of black lettering, and 1000 pages of red lettering. The maximum capacity of cell 138 is 2000 pages of black lettering and 2000 pages of blue. At this amount, cell 138 has a current capacity to print 1000 pages more of black lettering, and 1000 pages of blue lettering. If sub-job 134 has 500 pages of black lettering and 600 page red lettering, then cell 138 would handle sub-job 134. As shown from step 158, a pull-type control policy 150 is used to assign the sub-job to the respective cell 138, 140, and 142 with the available current capacity to handle the sub-job. The pull-sequence can be arbitrarily chosen in a pre-specified manner. Cell 138 can start pulling the subjobs followed by cell 140 and so on and so forth. One could choose any other sequence. In this instant, cell 138 has a current capacity for printing 1000 pages of black lettering and 1000 pages of blue lettering. Cell 140 current capacity for printing 1000 pages of black and 1000 pages of blue lettering. The printing workflow system 130 will split a document processing job 128 having 2000 pages to be assigned to cell 138, 140 respectively.

Figure 14:
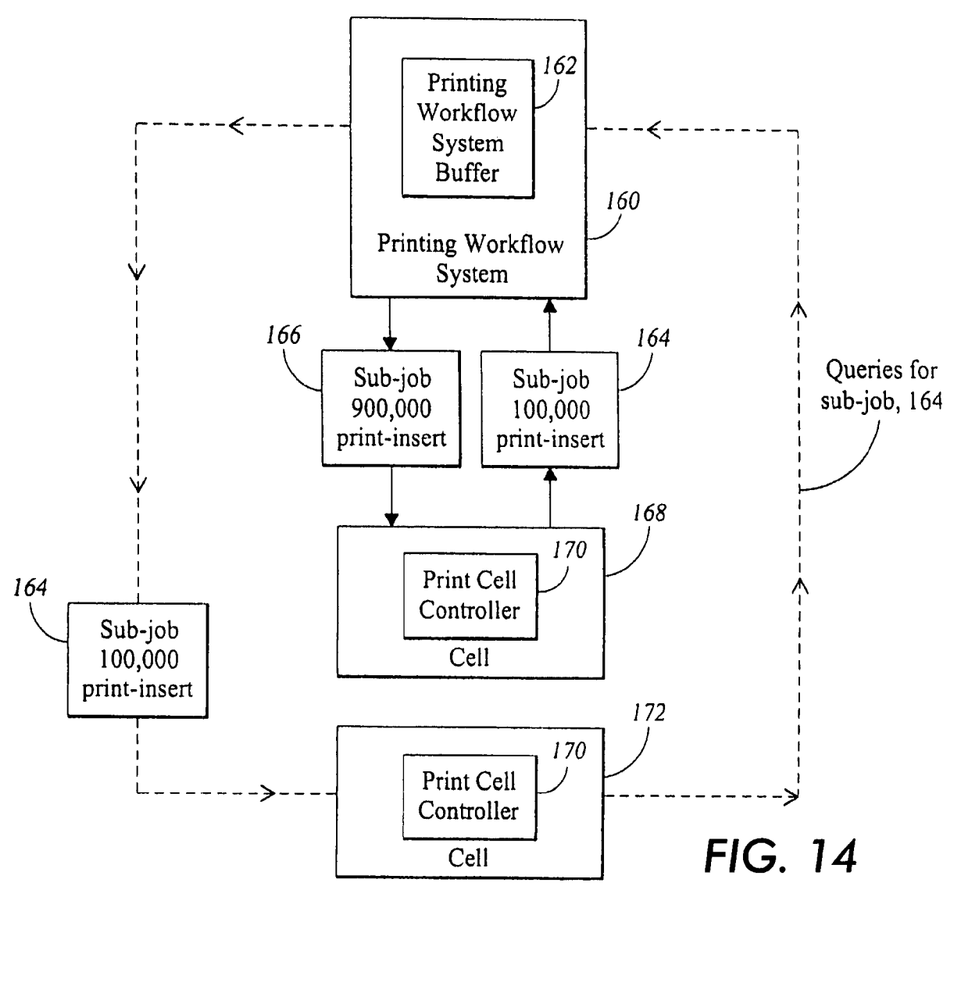
FIG. 14 is an illustration of the steps needed to calculate the terms and capacity of each available cell.

FIG. 14 illustrates using the print cell controller to administer sub-job processing when one of the devices failed during processing according to one aspect of the present invention. In the event the print cell controller 170 recognizes that it cannot deliver what it was supposed to due to unforeseen production uncertainty of an input operator availability, or machine breakdown it notifies the higher level module of the printing workflow system 160 about that. The printing workflow system 160 stores the production requirement in a buffer. The system 160 is built in a manner such that whenever the print cell controller 170 determines the available capacity in the cell 168, it polls the printing workflow system buffer 162 to determine if it contains sub-jobs to be processed. Whenever the print cell controller 170 detects jobs in the printing workflow system buffer 162, it pulls the necessary amount of information for processing. For example, if cell 168 failed after printing 300,000 print-insert jobs wherein it was supposed to process 400,000 print-insert jobs. Print cell controller 170 corresponding to cell 168 then puts the remaining unfinished sub-job information in the printing system workflow buffer 162. Suppose that print cell controller 170 of cell 172 determines it has the capacity to process 100,000 print-insert sub-job 164. It queries the printing workflow system buffer 162 in printing workflow system 160 and determines that sub-job 164 needs completion. It therefore pulls the sub-job 164 into cell 172 for processing.

Numerous modifications and alternative embodiments of the invention will be apparent to those skilled in the art in view of the foregoing description. Accordingly, this description illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

The invention claimed is:

1. A printing workflow system disposed in a network environment for coordinating production of document processing jobs, said printing workflow system comprising:
   a plurality of autonomous cells, wherein each autonomous cell is comprised of a plurality of devices and resources with at least some devices and resources performing distinct operations from one another, and that are configured to be capable of entirely completing at least one type of document processing job within said autonomous cell such that there is no dependence upon other autonomous cells for completing a selected one type of document processing job;
   a workflow mapping module that determines workflow for the selected one of said document processing jobs by identifying a sequence of operations needed to be performed to complete the selected document processing job;
   a job decomposition module for splitting the selected document processing job into a plurality of autonomous sub-jobs that are accomplished by the autonomous cells, wherein splitting occurs based on determined differences between said sequence of operations of the selected document processing job and further splitting may occur on the autonomous sub-jobs containing the same sequence of operations to facilitate faster completion by using multiple devices;
   a cell assignment module for assigning said autonomous sub-jobs to said given ones of the autonomous cells capable of entirely accomplishing said autonomous sub-jobs; and
   a product cell controller at a selected one of the given autonomous cells for receiving at least one of said autonomous sub-jobs and for further splitting said at least one autonomous-sub job into lots for processing among said plurality of devices in said selected autonomous cell, wherein a selected device within the plurality of devices and resources uses a kanban based pull control policy to request work by sending authorization to the upstream product cell controllers to supply said device with authorized work.

2. The printing workflow system of claim 1 further comprising a storage device for holding information regarding capacities and capabilities of said cells and for storing information regarding workflow of each document processing job said workflow comprising a sequence of operations needed to be performed to accomplish the selected document processing job.

3. The printing workflow system of claim 2 wherein said product cell controller splits said autonomous sub-jobs into optimal lot sizes determined by analyzing said workflow of said selected document processing job, wherein said document processing sub-job is split into smaller lots for optimal utilization of said autonomous cells such that as one said autonomous cell processes one said lot, another said autonomous cell processes another said lot, simultaneously.

4. The printing workflow system of claim 3 wherein said product cell controller assigns a number of kanbans to said lots as workflow control elements.

5. The printing workflow system of claim 4 wherein said product cell controllers send authorization in the form of kanbans to upstream devices calling for said upstream devices to supply said autonomous cells a with next lot and wherein said assigned kanbans are released as said lots are processed and said assigned kanbans become available for future authorization of future lots.

6. The printing workflow system of claim 2 wherein the workflow mapping module uses said information to determine a workflow for a selected document processing job and the job decomposition module uses said workflow to split said document processing job into autonomous sub-jobs.

7. The printing workflow system of claim 6 wherein the cell assignment module uses said workflow to assign said autonomous sub-jobs to given ones of said autonomous cells capable of accomplishing said sub-job.

8. A method used in a print workflow system disposed in a network environment for coordinating production of document processing jobs, said method comprising:
    partitioning document processing devices and resources into a plurality of autonomous cells capable of entirely completing at least one type of document processing job within said autonomous cell such that there is no dependence upon other cells for completing the document processing job;
    determining workflow for a selected one of said document processing jobs by identifying a sequence of operations necessary to complete said document processing job;
    splitting a selected document processing job into a plurality of autonomous sub-jobs that are able to be entirely accomplished by given ones of the autonomous cells, wherein splitting occurs based on a determined difference between the sequence of operations of the document processing jobs and further splitting selectively occurs on another document processing job containing an identical sequence of operations to facilitate faster completion by using multiple devices;
    assigning said document processing sub-jobs to said given ones of the autonomous cells capable of accomplishing a selected one of the autonomous sub-jobs; and
    receiving at a selected one of the given cells at least one of the autonomous sub-jobs and further splitting said one autonomous sub-job into lots for processing among devices and resources in said selected autonomous cell, wherein a device within the plurality of devices and resources use a kanban based pull control policy to request work by sending authorization to the upstream product cell controller to supply said device with authorized work; including,
    a) splitting said autonomous sub-job into optimal lot sizes determined by analyzing said workflow of said selected document processing job, whereby said autonomous sub-job is split into smaller lots for optimal utilization of said cell devices;
    b) assigning a number of kanbans to said lots as workflow control elements; and
    c) sending authorization in the form of kanbans from cell devices to upstream devices calling for said upstream devices to supply said selected cell devices with a next lot and wherein said assigned kanbans are released as said lots are processed and said assigned kanbans become available for future authorization of future lots.

9. The method recited in claim 8 further comprising holding information regarding capacities and capabilities of said cells and for storing information regarding workflow of each document processing job, said workflow being comprised of the sequence of operations needed to be performed to accomplish the selected document processing job.

10. The method recited in claim 9 wherein a job decomposition module uses said determined workflow for the splitting of said document processing job into autonomous sub-jobs.

11. The method recited in claim 10 wherein the assigning the autonomous cells uses said workflow to assign said autonomous sub-jobs to given ones of said autonomous cells capable of accomplishing said autonomous sub-job.

* * * * *